G. E. AND C. A. STUART.
PNEUMATIC TIRE.
APPLICATION FILED JAN. 7, 1920.

1,423,277.

Patented July 18, 1922.

George E. Stuart
Charles A. Stuart
By Jas. I. Cary
    Attorney.

UNITED STATES PATENT OFFICE.

GEORGE E. STUART AND CHARLES A. STUART, OF OREGON CITY, OREGON.

PNEUMATIC TIRE.

1,423,277. Specification of Letters Patent. Patented July 18, 1922.

Application filed January 7, 1920. Serial No. 349,931.

*To all whom it may concern:*

Be it known that we, GEORGE E. STUART and CHARLES A. STUART, citizens of the United States, residing at Oregon City and State of Oregon, have jointly invented certain new and useful Improvements in Pneumatic Tires, of which the following is a specification.

Our invention relates to pneumatic tires having an outer casing and an inner tube, the principal object of our invention being to provide an outer casing whose inner wall can not be penetrated and therefore the inner tube can not be punctured by nails, tacks, glass, etc., as is frequently the case with the tires in common use. One of the causes of blowouts in pneumatic tires of this type is the heating of the air in the inner tube, caused by the heat generated by friction being transmitted through the casing to the air in the tube, causing it to expand until the tire explodes at some weakened spot. Our invention prevents this by interposing overlapping cells containing cotton, which is a poor conductor of heat, between the outer tread of the tire and the inner wall of the casing. Another object of my invention is to provide a means not only of making a new puncture proof tire, but which may be used to advantage in retreading a worn and discarded tire. Another object is to prevent the fibrous material, such as cotton, from creeping or crawling, by distributing it throughout the casing in pockets or cells, which restricts all possibility of such movement.

Figure 1:
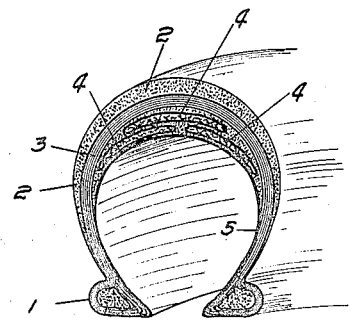
Figure 2:
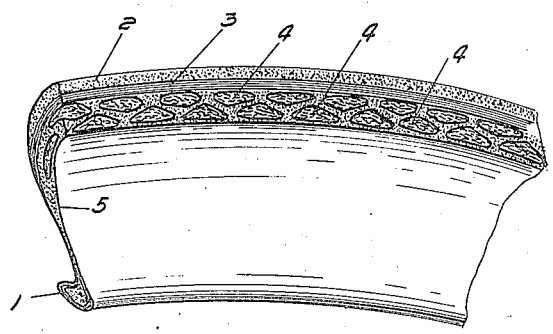
Figure 3:
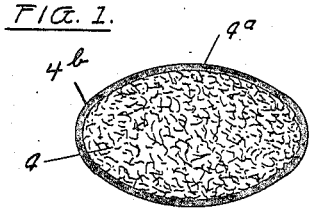
Figure 4:
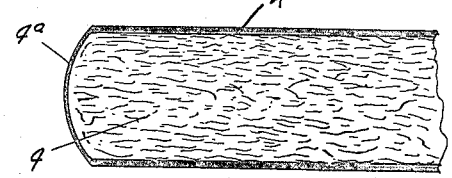
Figure 5:
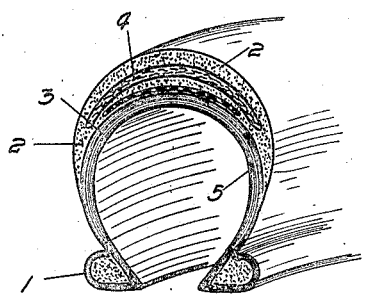
Figure 6:
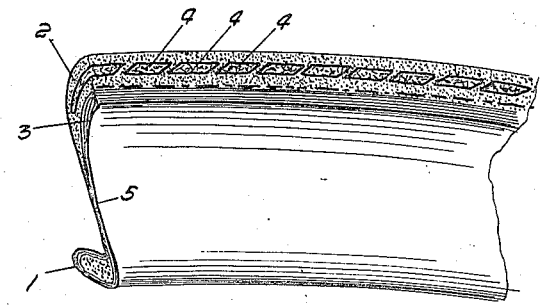

Referring to the drawings, Figure 1 is a perspective cross section of the outer casing on a new tire. Figure 2 is a longitudinal section cut through the center of the casing. Figure 3 is a cross section of one of the cells 4. Figure 4 is a longitudinal section of part of one of the cells 4. Figure 5 is a perspective cross section of an old tire with retread. Figure 6 is a longitudinal section of old tire with retread.

We are aware that cotton has been used in the manufacture of tire protectors but not in the manner disclosed herein of incorporating the fibrous material in separate overlapping cells or pockets as part of the outer casing. Figure 1 shows in section how these cells are disposed within the tire. We first have the tread 2, then the layers of canvas 3, several ply, giving strength to the tire, 4, 4, 4, the pockets filled with cotton, and 5 the inner walls. All of these separate elements mentioned are firmly vulcanized together, forming one cohesive part of the tire called the outer casing. Figure 2 makes it plain that the pockets or cells 4, 4, can be so arranged that sharp pointed substances, such as nails, tacks, glass, etc., could not pierce or cut through to the inner wall 5 without encountering a mass of fibrous material within the cells 4. On the inside of each cell on the tread side, in addition to the rubber wall within which the cotton is contained and which forms the cell, is placed a strip of strong fabric, such as linen fabric, which has been treated with a resinous substance, so that it will tend to gather about the sharp point of any nail, tack or other foreign substance that might pierce through the tread 2 and the canvas layers 3, practically blunting the point by collecting about the same and thus making it almost impossible to thrust through the resisting cotton fiber within the cells 4, 4, to penetrate the inner wall 5 and puncture the inner air tube which, when distended, lies closely adjacent to this wall 5 of the casing.

In a new tire these pockets or cells 4, 4, are placed next to the inner wall 5 of the casing, Figures 1 and 2, so that any foreign substance which has succeeded in piercing or cutting through the tread 2 and canvas layers 3 will encounter the cotton fibers within the cells, pressing them against the inner wall 5 of the casing, which yieldingly resists and thus tends to avoid puncture. When retreading an ordinary used tire however, the canvas plies 3, Figures 5 and 6, are next the inner wall 5 and the cotton filled cells are incorporated in the built up tread part as shown, and when the nail, or other pointed or sharp material encounters the fibers and thrusts toward the inner tube, the layers of canvas 3 are stiffly resistant, forming a backing which does not yield readily as in the arrangement described in Figures 1 and 2; and the cotton being compressed against the canvas section is more likely to be cut through, although retreaded tires made as set forth have withstood many deliberate attempts to puncture the inner tube. In one distribution of the cells that has proved very successful only one row of overlapping cells, as in Figure 6, has been used.

In making up these cells, strips of sheet rubber are used in which the cotton is wrapped, Figure 3 being a cross section which shows the rubber walls 4ᵃ of the cell 4. In longitudinal section, Figure 4 shows part of a cell 4, which is placed lengthwise in the tire as shown in Figure 1. The cells are thus imbedded in rubber composition and after the tire has been vulcanized all the elements or parts that go to make up the outer casing are firmly knit and joined together, the cells being held in place so that it is impossible for them to change their relative position. On the tread side of each cell, and next to the wall thereof is placed a strip of stout fabric, 4ᵇ, Figures 3 and 4, which has been chemically treated and which tends to make it impervious to puncture and which increases the difficulty of thrusting anything through the fibrous material in the cell. It will be readily appreciated that when such a cell as has been described has been compressed, upon its release from pressure it will immediately resume its original shape, owing to the inherent resiliency of the cotton or fibrous content of the cell. In the making of the tire all of the parts are subjected to heavy pressure, but with no resulting loss of resiliency, the finely divided fibres in the cells aiding rather than detracting from the desirable cushioning effect of the tire.

It is evident that many changes and alterations in the size, shape, disposition and fibrous content of the cells may be made, all within the scope of our invention, and therefore we do not confine ourselves to the exact forms set forth above, believing it to be broadly new in the manufacture of pneumatic tires to employ the cellular structure herein described.

We claim:

1. In a pneumatic tire, a series of cells having a vulcanizable envelope, a fibrous filling, and a puncture resisting strip arranged between the filling and envelope throughout a determinate area of such cell.

2. In a pneumatic tire, a series of relatively overlapping wholly independent cells, each including a rubber envelope, a fibrous filling, and a puncture resisting strip arranged between the filling and envelope including a strip of fabric chemically treated to resist penetration.

3. In a pneumatic tire, a series of independent cells, each having a vulcanizable envelope, a fibrous filling, and a puncture resisting strip between the filling and envelope, said cells being arranged in superimposed rows circumferentially of the tire casing and in relatively offset relation radially of the casing.

GEORGE E. STUART.
CHARLES A. STUART.